W. WOERLE.

BEER COOLER.

No. 7,197. Reissued June 27, 1876.

Witnesses:
C. Clarence Poole
Geo. H. Moore

Inventor:
William Woerle
per attys. A. H. Evans & Co
Washington D.C.

N. PETERS, PHOTO-LITHOGRAPHER, WASHINGTON, D. C.

UNITED STATES PATENT OFFICE.

WILLIAM WOERLE, OF MILWAUKEE, WISCONSIN.

IMPROVEMENT IN BEER-COOLERS.

Specification forming part of Letters Patent No. 151,261, dated May 26, 1874; reissue No. 7,197, dated June 27, 1876; application filed June 10, 1876.

*To all whom it may concern:*

Be it known that I, WILLIAM WOERLE, of Milwaukee, in the State of Wisconsin, have invented a new and Improved Floating Beer-Cooler, of which the following is a full, clear, and exact description, reference being had to the accompanying drawings, making part of this specification, in which—

Figure 1:
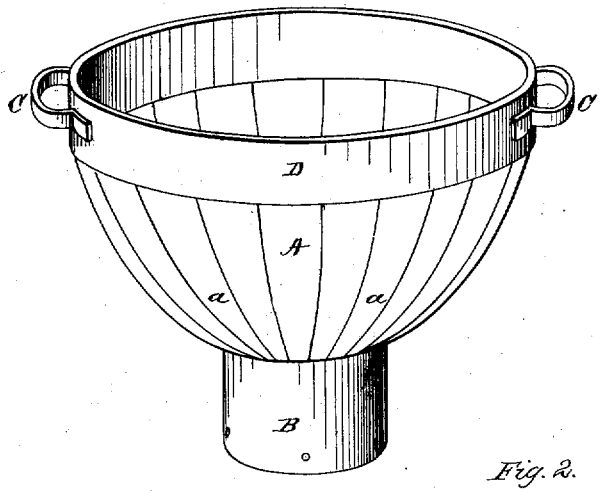
Figure 2:
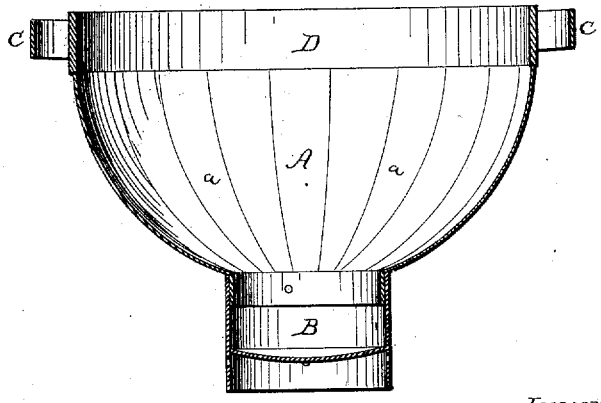

Figure 1 is a perspective view of my invention. Fig. 2 is a vertical sectional view.

In the said drawings, A is the body of the floating cooler, having strips of metal *a a* arranged vertically, converging at the bottom, and their edges fastened together to form it. At the bottom I fasten a short cylindrical piece, B, to act after the manner of a keel, and retard the tipping over of the body A. Handles C C are attached to the upper edge; and D is a rim of metal round the top of the swimmer or cooler, it being dispensed with when the metal strips are long enough to make the cooler deep enough. The cylindrical keel may be provided with suitable holes to allow the escape of air when the cooler is placed in the beer.

Having thus described my invention, what I claim as new, and desire to secure by Letters Patent, is—

As a new article of manufacture, a floating beer-cooler, having converging vertical strips *a a*, and projecting bottom B, substantially as set forth.

WILLIAM WOERLE.

Witnesses:
FR. W. WOLF,
R. K. EVANS.